United States Patent
Williams

Patent Number: 4,468,169
Date of Patent: Aug. 28, 1984

[54] REGULATED HIGH TORQUE FLEXIBLE BLADED WIND WHEEL

[76] Inventor: Dennis L. Williams, 1520 E. Canyon Dr., South Weber, Utah 84403

[21] Appl. No.: 409,231

[22] Filed: Aug. 18, 1982

[51] Int. Cl.³ .............................................. F03D 7/06
[52] U.S. Cl. .............................. 416/119; 416/132 B; 416/140
[58] Field of Search ............... 416/119, 41 R, 132 B

[56] References Cited

U.S. PATENT DOCUMENTS

| | | | |
|---|---|---|---|
| 7,041 | 5/1832 | Colman | 416/112 |
| 226,357 | 4/1880 | Saccone | |
| 297,904 | 4/1884 | Witherspoon | 416/119 |
| 485,933 | 11/1892 | Herman | 416/119 |
| 498,068 | 5/1893 | Lonning | 416/140 R |
| 835,667 | 11/1906 | Donnelly | |
| 1,015,517 | 1/1912 | Snyder | 416/118 |
| 1,230,885 | 6/1917 | Gay | 416/118 |
| 1,469,064 | 9/1923 | Zucker | 416/41 X |
| 1,511,965 | 10/1924 | Hennigh | 416/119 X |
| 2,128,592 | 8/1938 | Mushkin | 416/119 |
| 2,406,268 | 8/1946 | Terhune | 416/139 A X |
| 2,542,522 | 2/1951 | Hings | 290/55 |
| 3,938,907 | 2/1976 | Magoveny et al. | 415/141 |
| 3,995,170 | 11/1976 | Graybill | 290/55 |
| 4,039,849 | 8/1977 | Mater et al. | 290/55 |
| 4,048,947 | 9/1977 | Sicard | 416/119 |
| 4,184,084 | 1/1980 | Crehore | 290/55 |
| 4,218,183 | 8/1980 | Dall-Winther | 416/41 |
| 4,334,823 | 6/1982 | Sharp | 416/119 |
| 4,346,305 | 8/1982 | White | 416/140 X |

FOREIGN PATENT DOCUMENTS

| | | | |
|---|---|---|---|
| 2033463 | 3/1972 | Fed. Rep. of Germany | 416/119 |
| 63806 | 7/1864 | France | 416/117 |
| 2426813 | 1/1980 | France | 416/140 |
| 2469576 | 5/1981 | France | 416/119 |

*Primary Examiner*—Everette A. Powell, Jr.
*Attorney, Agent, or Firm*—Donald J. Singer; Bobby D. Scearce

[57] ABSTRACT

An improved horizontally mounted wind wheel is provided which comprises a framework mounted for rotation in a horizontal plane on a central upright drive shaft, a plurality of secondary shafts supported for rotation on said framework near the periphery thereof, a vane mounted near one end thereof to each secondary shaft, a plurality of vane stops on the framework positioned radially inwardly of the secondary shafts for limiting the rotation of the vanes, each of said secondary shafts being mounted for rotation about an axis which is tilted with respect to a vertical to said horizontal plane whereby each vane has a preferred predetermined rest position defined by the direction of tilting of each axis from a said vertical.

4 Claims, 4 Drawing Figures

REGULATED HIGH TORQUE FLEXIBLE BLADED WIND WHEEL

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of windmills, and more paricularly to improvements in windmills having horizontally mounted wind wheels configured to drive vertically mounted shafts. Specifically, the present invention provides a novel horizontally mounted wind wheel uniquely configured for rotation in a predetermined direction at a substantially self-regulated rotational speed.

The wind wheel of the present invention finds substantial utility for power generation using natural phenomena. Configured primarily to drive a vertically mounted rotating shaft operatively connected in conventional fashion, the present invention may be used either as a primary or back-up power source to drive electrical generators, pumps, compressors or the like, and may find particular utility in remote areas for power generation.

The essence of the invention described herein is the provision of a horizontally mounted wind wheel uniquely configured to rotate in one predetermined direction at a substantially self-limiting rotational speed. The wind wheel of this invention comprises in a preferred representative embodiment, a plurality (preferably 3, 4, 5 or 6) of horizontally mounted arms equally spaced around a central supporting hub mounted for rotation with a vertically mounted drive shaft; each arm supports near its peripheral extremity a pivotally mounted flexible vane which is free to rotate about its pivot between limits defined by a vane stop provided on each arm. The size, weight and flexibility of the vanes may be selected to substantially limit the rotational speed of the wind wheel to a desired RPM or range of RPM for most anticipated wind velocities without regard to radical wind velocity fluctuations, and to provide protection to the wind wheel against damage in high wind or gust conditions. The unique pivotal mounting configuration for each vane provides for rotation of the wind wheel in a predetermined direction. In addition to the foregoing advantages, the wind wheel of the present invention may be successfully operated without complicated auxiliary rotational speed regulators or other precision components, is highly resistant to damage from high winds, and, therefore, may be used for power generation under severe weather conditions.

It is, therefore, an object of the present invention to provide an improved windmill comprising a wind wheel operating in a horizontal plane.

It is another object of this invention to provide a horizontally mounted wind wheel having a predetermined rotational direction.

It is yet another object of this invention to provide a high torque wind wheel having substantially self-limiting rotational velocity.

It is a further object of this invention to provide a wind wheel which is operable in high wind velocity conditions without risk of damage, is simple to fabricate and operate, and which, therefore, is suitable for power generation in remote areas.

These and other objects of the present invention will become apparent as the detailed description of certain representative embodiments thereof proceeds.

SUMMARY OF THE INVENTION

In accordance with the foregoing principles and objects of the present invention, an improved horizontally mounted wind wheel is provided which comprises a framework mounted for rotation in a horizontal plane on a central upright drive shaft, a plurality of secondary shafts supported for rotation on said framework near the periphery thereof, a vane mounted near one end thereof to each secondary shaft, a plurality of vane stops on the framework positioned radially inwardly of the secondary shafts for limiting the rotation of the vanes, each of said secondary shafts being mounted for rotation about an axis which is tilted with respect to a vertical to said horizontal plane whereby each vane has a preferred predetermined rest position defined by the direction of tilting of each axis from a said vertical.

DESCRIPTION OF THE DRAWINGS

The present invention will be more clearly understood from the following detailed description of certain representative embodiments thereof read in conjunction with the accompanying drawings wherein.

DETAILED DESCRIPTION

Figure 1:
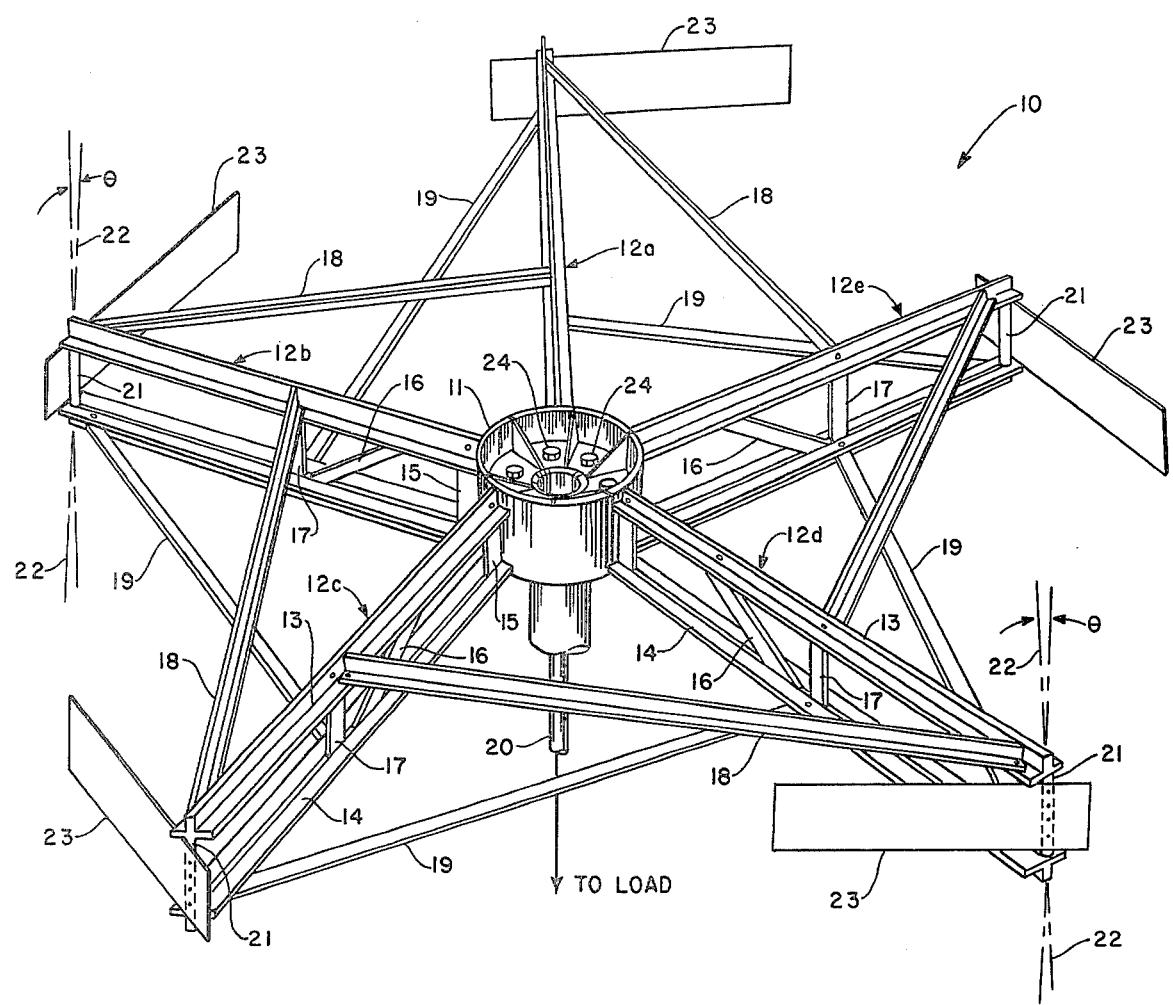
FIG. 1 is a perspective view of a representative embodiment of the wind wheel of this invention having five vane supports.

Referring now to FIG. 1, shown therein is a perspective view of a representative embodiment of the blade assembly of a horizontally mounted wind wheel 10 of the present invention. As shown in FIG. 1, wind wheel 10 may comprise a central hub 11 supporting a plurality of equally spaced, radially extending vane support arms 12a–e. As will become apparent from a further reading hereof, the size and shape of wind wheel 10 is not limiting of the invention herein, and the radial arm structure suggested in the figures is therefore only illustrative of the configuration contemplated hereunder. FIG. 1 illustrates a wind wheel 10 having five radially extending support arms 12, which number was used in the construction of a unit in demonstration of the invention herein. As will become apparent from a further reading hereof, the number of support arms 12 may vary within the scope of the teachings hereof. However, for practical purposes associated with construction and operation of a model of the wind wheel of this invention, as described below, wind wheel 10 would preferably comprise three, four, five, or six such support arms 12.

In the demonstration device, each vane support arm 12 comprised horizontally mounted upper and lower radial members 13, 14 assembled conventionally in spaced relationship, substantially as shown in FIG. 1, using central brace 15, strut 16 and upright vane stop 17, to define a substantially rigid frame. Upper cross braces 18 and lower cross braces 19 interconnected support arms 12a-e to provide substantial structural rigidity to the assembly comprising wind wheel 10. Each vane support arm 12 assembly was secured conventionally to central hub 11 such as by welding. The entire assembly comprising wind wheel 10 was mounted for rotation with shaft 20 using a rotatable drum and bearing assembly more fully described below in relation to FIG. 4.

Near the end of each vane support arm 12 a small shaft 21 was journaled for rotation at its upper end to member 13 and at its lower end to member 14, through conventional bearing assemblies (not shown in detail). For reasons discussed below in connection with FIG. 2, shafts 21 were mounted for rotation about journal axes 22 which are not parallel to the axis of rotation of wind wheel 10 and shaft 20. Rather, axes 22 were tilted at a small angle $\theta$ with respect to a vertical to the plane of rotation of wind wheel 10.

To each shaft 21 a flexible vane or blade 23 was mounted for rotation about each axis 22. Vanes 23 were sized and configured to be free to rotate about their respective axes 22 through substantially 360°, provided, however, that vane stops 17 were preferably positioned radially inwardly of the shafts 21 along support arms 12 to prevent an unflexed vane 23 from rotating through the opening in each support arm 12 defined by members 13 and 14, shaft 21 and stop 17. It is not essential to the invention herein that vane stops 17 be positioned radially inward of shafts 21, as such positioning would depend upon the specific choice of mounting configuration for vanes 23 and shafts 21, since in certain configurations it may be desirable to otherwise locate stops 17. Vanes 23 were mounted such that, when rotated against arms 12 under the influence of a wind, they rotated into substantial alignment with the said opening. The length and flexibility of each vane 23 is selected such that when it is flexed lengthwise sufficiently, as under a strong wind bearing heavily against it, it may slip over and past its respective stop 17, and through the said opening defined by elements 13, 14, 17 and 21.

Figure 2:
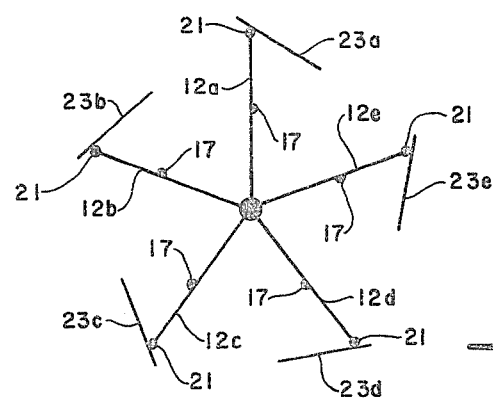
FIG. 2 is a schematic plan view of the wind wheel of FIG. 1 illustrating a rest position for the wheel and vanes.

Reference is now made to FIG. 2, in conjunction with FIG. 1, wherein the significance of the mounting of rotatable shafts 21 and vanes 23 is illustrated. FIG. 2 presents a schematic plan view, on reduced scale, of the wind wheel 10 of FIG. 1 in the orientation which vanes 23 assume under calm (no wind) conditions. By mounting the rotatable shafts 21 such that their axes of rotation are off plumb, such as by an amount represented by angle $\theta$ illustrated in FIG. 1, each vane 23 will have a preferred rest position to which it will rotate under calm (no wind) conditions when wind wheel 10 is at rest. Under such conditions, each vane 23 will rotate to a position of least potential energy wherein its length is aligned in the direction of $\theta$ from a vertical to the plane of wind wheel 10 (to the plane of FIG. 2). Therefore, if each rotatable shaft 21 has its axis tilted in a clockwise tangential direction, the same angle $\theta$ relative to a vertical to the plane of wind wheel 10, vanes 23 will seek, under calm conditions, the respective orientations illustrated schematically in FIG. 2. Depending upon the intended application of the invention herein, and the desired predetermined rest position for vanes 23, it may be desirable, additionally, to tilt the axes of rotation of shafts 21 slightly radially inward (or outward), that is, to provide $\theta$ with a radial as well as a tangential component. In the configuration of FIG. 2, $\theta$ has a clockwise tangential component, and a radially inwardly directed component. When a wind arises affecting wind wheel 10, all vanes 23 will rotate such as to align with the direction of the wind and those vanes on the windward side of wind wheel 10 will rotate against their respective stops, initiating rotation of wind wheel 10 in the same direction that the said windward vanes 23 rotate to contact their respective stops 17. It is clear, therefore, that, given wind wheel 10 initially at rest having the vane 23 orientations suggested by FIG. 2, when a wind arises, wind wheel 10 will rotate counterclockwise (as FIG. 2 is viewed) without regard to wind direction. It is recognized, that by suitable mounting of shafts 21, wind wheel 10 can be made to rotate only clockwise.

Figure 3:
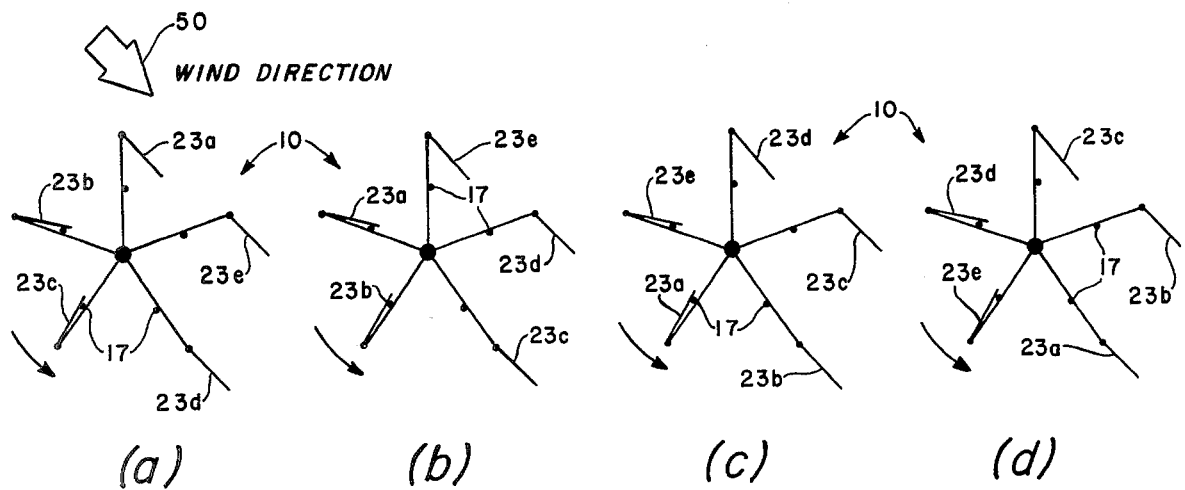
FIG. 3 illustrates four seriatim positions for the wind wheel of FIG. 2 under the influence of a wind.

Referring now to FIG. 3, presented therein are schematic representations of four seriatim positions assumed by wind wheel 10, initially at rest as in FIG. 2, as it rotates under the influence of a wind 50 blowing in from the northwest as indicated by the arrow. Under the influence of wind 50, wind wheel 10, initially in the rest position of FIG. 2, would tend to assume the position of FIG. 3a at the inception of rotation wherein each vane 23a-e would tend to rotate about its respective shaft 21 to align with the direction of wind 50 as discussed above. Accordingly, vanes 23a, d, e would rotate away from their respective stops 17, and vanes 23b, c would rotate toward and in contact with their respective stops, initiating counterclockwise rotation of wind wheel 10. As wind wheel 10 continues to rotate, vanes 23 will pass through the position illustrated by FIG. 3b wherein vane 23a has rotated against its stop, in turn, to provide resistance to wind 50 to continue the counterclockwise rotation of wind wheel 10; correspondingly, vane 23c has, under the influence of wind 50, rotated away from its stop and swung around in line with the wind direction. Continuing to FIGS. 3c and 3d it is seen that each vane 23a-e, in turn, is rotated around into the wind, and against its stop to provide sufficient wind resistance to continue the rotation of wind wheel 10.

It is noted that the weight, size, and flexibility of the vanes 23 may be predetermined in order to limit the maximum speed at which wind wheel 10 will rotate under high wind conditions, and thereby avoid damage to the wind wheel, bearing assembly and/or supporting structure. First, as vanes 23 rotate away from their respective stops 17 to align with the wind direction, e.g., 23d in FIG. 3a, 23c in FIG. 3b, etc., the inertia of wind wheel 10 is increased, and some wind resistance is encountered in aligning vanes 23 with the wind direction, both factors tending to prevent excessive rotational speeds. Second, under extreme wind conditions involving gusts to unacceptably high wind velocities, each vane 23 may flex sufficiently as illustrated by dashed lines of vane 23 in FIG. 3(c) at a', and in FIG. 3(d) at e', to slip past its respective stop 17 in order to minimize wind resistance and, correspondingly, reduce rotational speeds under such extreme conditions.

Figure 4:
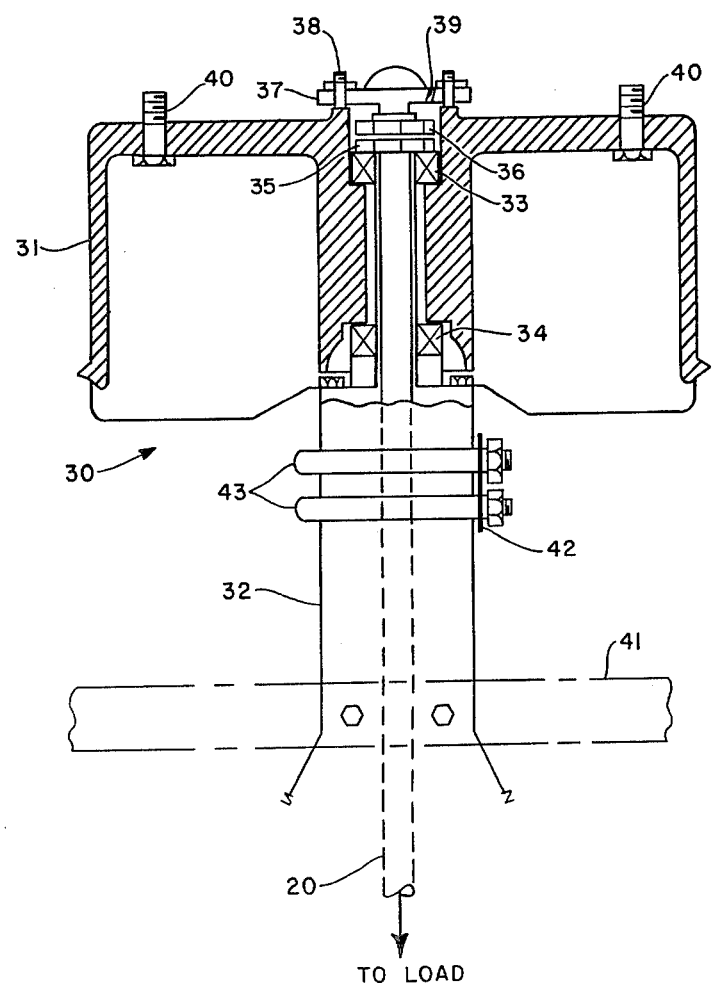
FIG. 4 shows a representative bearing assembly useful for supporting the wind wheel of FIG. 1, and for transmitting torque to a rotatable shaft.

A representative bearing assembly 30 for supporting wind wheel 10 and transmitting torque to a rotating shaft 20 is shown schematically in FIG. 4, and was found to be functionally satisfactory in the demonstration unit constructed. Drum 31 was mounted for rotation to shaft 20 and was rotatably supported by stationary shaft housing 32 through upper bearings 33 and lower bearings 34. Jam nut 35 and locking nut 36 on a threaded portion of shaft 20 served to retain bearings 33 and 34 in conventional fashion. Retaining member 37 secured to drum 31 through studs 38 held drum 31 for rotation with shaft 20. The bearing 33, 34 configuration, in cooperation with drum 31 and retaining member 37 provided an oil seal around shaft 20 within drum 31 for smooth operation of bearing assembly 30. Consequently, retaining member 37 was provided with a threaded hole 39 (configured to receive a plug not shown in the drawings) through which oil may be added to maintain an oil level over bearing 33.

Drum 31 included a plurality of lug bolts 40 through which central hub 11 of wind wheel 10 could be secured for rotation to shaft 20 by way of mating lug nuts 24 (see FIG. 1).

In the unit constructed in demonstration of the invention herein, the generator facility (not shown) to which the shaft 20 was operatively interconnected was housed in a structure configured to support wind wheel 10 and bearing assembly 30. To this end, braces 41, 42 forming a part of the support structure held bearing assembly 30 in a substantially rigid upright position through conventional clamping means such as illustrated in FIG. 4 as U-bolts 43 encircling shaft housing 32.

In the unit built in demonstration of the invention herein, substantial use was made of conventional building materials and other readily available parts to assemble an operable wind wheel 10 having a radius (length of arms 12) of about 10 feet. Support arms 12 and cross braces 18 and 19 comprised conventional one-inch or two-inch angle iron assembled into the configuration illustrated in FIG. 1 using well known assembly methods. Vanes 23 comprised $\frac{1}{4}$-inch thick fiberglass approximately 21 inches wide by 65 inches long. Shafts 21 were mounted using conventional leveling methods such that their respective axes of rotation were tilted, with respect to a vertical, by an angle $\theta$ of about $\frac{1}{2}°$ to about 1°, which corresponded to a maximum difference in elevation of the distal end of each vane 23 from windward to leeward side of about $\frac{1}{2}$-inch, which proved sufficient for vanes 23 to assume the intended rest position such as suggested in FIG. 2.

It is desirable to construct wind wheel 10 in such manner that each vane 23 will not contact an adjacent vane during operation. Simple geometric considerations dictate that if vanes 23 are of a length approximating one-half that of the radius of the wind wheel, as in the demonstration unit, the number of vane support arms is limited to six (or less) in order to prevent vanes on adjacent support arms from interferring with each other. This consideration is presented however to suggest a set of optimum parameters for constructing an operable device, and not to limit the scope of the invention herein.

The present invention, as hereinabove described in certain representative embodiments thereof, therefore provides an improved windmill and wind wheel therefor. It is understood that certain modifications to the said invention as described may be made and alternative uses thereof are envisioned as would occur to one with skill in the applicable field. Therefore, all embodiments contemplated hereunder have not been shown in complete detail. Other embodiments may be developed without departing from the spirit of this invention or from the scope of the appended claims.

I claim:

1. In a windmill device including a wind wheel configured to rotate in a generally horizontal plane on a vertically disposed drive shaft, an improvement wherein said wind wheel comprises:
   a. means defining a framework mounted for rotation with said drive shaft in a generally horizontal plane;
   b. a plurality of second rotatable shafts supported by said framework in a radially spaced relationship to said drive shaft;
   c. a plurality of flexible vanes, each of said vanes mounted near one end thereof to a said second shaft for rotation therewith;
   d. each of said second shafts mounted for rotation about an axis which is tilted with respect to a vertical to said horizontal plane whereby each said vane has a preferred predetermined rest position defined by the direction of tilting of each said axis from a said vertical, each said axis being tilted at a tilt angle having a component in the same tangential direction and including a radially inwardly directed component, whereby said vanes, in their rest positions, are oriented substantially identically relative to a radius through their respective axes of rotation; and
   e. a plurality of vane stops disposed on said framework radially inwardly of said second shafts for limiting the rotation of each vane about its respective axis of rotation, said stops disposed on said framework to allow said vanes to rotate past said stops when said vanes are flexed to a predetermined degree.

2. The windmill device as recited in claim 1 wherein said framework includes a plurality of horizontally disposed arms secured to said shaft, extending radially therefrom and fixed for rotation therewith, each of said arms supporting a second rotatable shaft, a vane, and a vane stop.

3. The windmill device as recited in claim 2 wherein the number of arms is selected from a group consisting of 3, 4, 5 and 6.

4. The windmill as recited in claim 1 wherein said axes of said second shafts are tilted with respect to a vertical to said horizontal plane at an angle of about 1°.

* * * * *

UNITED STATES PATENT AND TRADEMARK OFFICE
CERTIFICATE OF CORRECTION

PATENT NO. : 4,468,169

DATED : August 28, 1984

INVENTOR(S) : Dennis L. Williams

It is certified that error appears in the above-identified patent and that said Letters Patent is hereby corrected as shown below:

In the Drawings, sheet 2, Fig. 3 should be deleted to appear as per attached Fig. 3.

Signed and Sealed this

Sixteenth Day of April 1985

[SEAL]

Attest:

DONALD J. QUIGG

Attesting Officer

Acting Commissioner of Patents and Trademarks

UNITED STATES PATENT AND TRADEMARK OFFICE
CERTIFICATE OF CORRECTION

PATENT NO. : 4,468,169

DATED : August 28, 1984

INVENTOR(S) : Dennis L. Williams

It is certified that error appears in the above-identified patent and that said Letters Patent is hereby corrected as shown below:

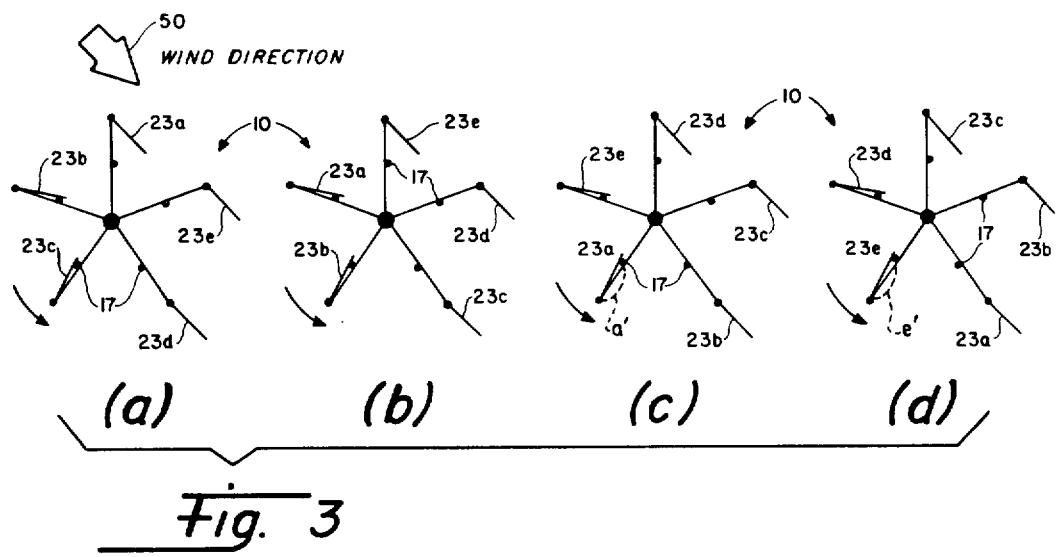

Fig. 3